United States Patent [19]

Mizuno et al.

[11] Patent Number: 5,775,975
[45] Date of Patent: Jul. 7, 1998

[54] METHOD OF LAPPING A BEVEL GEAR

[75] Inventors: Sadao Mizuno, Nagoya; Akinori Hoshino, Toyota; Tetsuya Morita, Gamagori, all of Japan

[73] Assignee: Aisin Seiki Kabushiki Kaisha, Kariya, Japan

[21] Appl. No.: 741,912

[22] Filed: Oct. 31, 1996

[30] Foreign Application Priority Data

Oct. 31, 1995 [JP] Japan .................................. 7-283872

[51] Int. Cl.[6] ............................................. B24B 1/00
[52] U.S. Cl. ............................ 451/47; 451/36; 451/900
[58] Field of Search ............................. 451/36, 47, 48, 451/900

[56] References Cited

U.S. PATENT DOCUMENTS

| | | | |
|---|---|---|---|
| 1,822,846 | 9/1931 | Wildhaber | 451/900 X |
| 2,256,586 | 9/1941 | Wildhaber | |
| 2,913,858 | 11/1959 | Praeg et al. | 451/47 X |
| 3,813,821 | 6/1974 | Takahashi et al. | 451/47 |
| 3,909,990 | 10/1975 | Tersch | 451/47 |
| 3,955,327 | 5/1976 | Franco | 451/47 X |
| 4,799,337 | 1/1989 | Kotthaus | 451/47 X |
| 5,000,632 | 3/1991 | Stadtfeld | 451/47 X |
| 5,020,279 | 6/1991 | Abysov et al. | 451/47 X |
| 5,044,127 | 9/1991 | Ryan | 451/47 |
| 5,079,877 | 1/1992 | Abysov et al. | 451/47 X |
| 5,299,390 | 4/1994 | Kato et al. | 451/47 |

OTHER PUBLICATIONS

Catalog No. 514 published by Ohkura Gleason Asia Co., Ltd. in Japan.

*Primary Examiner*—Timothy V. Eley
*Attorney, Agent, or Firm*—Oblon, Spivak, McClelland, Maier & Neustadt, P.C.

[57] ABSTRACT

This invention aims to provide a method of lapping a bevel gear effectively by placing a gear-shaped tool whose axis has the same relation with the axis of the bevel gear as those of hypoid gears. In a double mode, gear-shaped tools are placed whose axes lie in a position offset with respect to the axes of the first gear and the second gear and have the same relation as those of hypoid gears. The first gear is engaged with one gear-shaped tool and the second gear is engaged with the other gear-shaped tool, while lapping liquid is supplied to engaging portions, thereby lapping engaging surfaces of toothed portions of the first gear and the second gear.

10 Claims, 3 Drawing Sheets

Prior Art

METHOD OF LAPPING A BEVEL GEAR

BACKGROUND OF THE INVENTION

1. Field of the Invention

This invention relates to a method of lapping a bevel gear. The method of the present invention may be applied to lapping of, for example, spiral bevel gears and hypoid gears.

2. Description of the Related Art

The related art will be described by taking spiral bevel gears as an example. As shown in FIG. 6(A), a pair of spiral bevel gears comprise a first gear 100 in the shape of a pinion gear having a first toothed portion 101 with curved tooth traces, and a second gear 200 in the shape of a ring gear having a second toothed portion 201 with curved tooth traces. As indicated in FIG. 6(A), an axis Wa of the first gear 100 and an axis Wb of the second gear 200 intersect at a point Pa at a right angle.

Conventionally, in order to attain tooth precision, the first toothed portion 101 of the first gear 100 and the second toothed portion 201 of the second gear 200, which constitute a pair of spiral bevel gears, are subjected to a lapping treatment comprising positioning the gears 100, 200 in an arrangement shown in FIG. 6(A), driving the first gear 100 to rotate, and as a result engaging the first gear 100 with the second gear 200 while supplying lapping liquid to engaging portions through a supply pipe 300.

This lapping treatment provides superior precision to an engaging surface of the first toothed portion 101 and an engaging surface of the second toothed portion 201. Therefore, even when gears have been subjected to quenching and other thermal treatments, which often cause distortion, the application of this lapping treatment after the thermal treatments is advantageous in correcting effectively distortion of the engaging surfaces caused by the thermal treatments.

In recent years, there has been a demand to apply this lapping treatment more effectively, in order to improve the productivity of lapping treatment and the precision of gear teeth considerably.

By the way, Catalog No. 514 published by OHKURA GLEASON ASIA Co., Ltd. in Japan discloses a technique of lapping hypoid gears shown in FIG. 6(B). In the case of hypoid gears, a first gear 100 and a second gear 200 are designed to have neither intersecting nor parallel axes by offsetting an axis Wc of the first gear 100 with respect to a point Pa by a predetermined distance $\Delta L3$.

The inventors of the present invention have found and confirmed by experiments that when lapping treatment is applied to hypoid gears, the effect of the lapping treatment is much enhanced. The reason why the lapping effect is improved is assumed as follows: When gears are designed to have non-parallel and nonintersecting axes of hypoid gears, lapping liquid is liable to slid, in the direction of tooth trace in the case of hypoid gears than in the case of only bevel gears, and the sliding causes microfine abrasive particles in the lapping liquid to roll.

If explanation is made with reference to planes 500 shown in FIG. 7 by way of example, reciprocation of the plates 500 in a sliding direction brings about rolling of microfine abrasive particles 502 sandwiched between the planes 500, whereby a lapping effect is improved. It is assumed that the method of the present invention can expect a similar improving effect.

SUMMARY OF THE INVENTION

The present invention has been conceived in view of the above circumstances.

It is a primary object of the present invention to provide a method of lapping a bevel gear more effectively, by placing a gear-shaped tool whose axis has the hypoid gear relation with respect to the bevel gear.

A method of lapping a bevel gear according to a first aspect of the present invention is a method of lapping at least one of a first gear and a second gear constituting a pair of bevel gears, which comprises:

placing at least one gear-shaped tool whose axis lies in a position offset by a predetermined distance with respect to an intersection with an axis of the at least one of the first gear and the second gear, and which is engaged with at least one of the first gear and the second gear, and engaging the at least one of the first gear and the second gear with the at least one gear-shaped tool, while supplying lapping liquid to engaging portions so as to apply a lapping treatment to an engaging surface of a toothed portion of the at least one of the first gear and the second gear.

The first gear and the second gear used in the method according to the first aspect of the present invention constitute a pair of bevel gears. It is preferable that toothed portions of the first gear and the second gear are a spirally toothed portion with curved tooth traces.

The method according to the first aspect of the present invention can adopt both a single mode in which one gear-shaped tool is used and a double mode in which two gear-shaped tools are used, as mentioned below.

In a single mode according to the method of the present invention, a gear-shaped tool is placed whose axis lies in a position offset by a predetermined distance with respect to an intersection with an axis of one of the first gear and the second gear, and which is engaged with the one of the first gear and the second gear. Then, the one of the gears is engaged with the gear-shaped tool, while lapping liquid is supplied to engaging portions, so that a lapping treatment is applied to an engaging surface of a toothed portion of the one of the gears.

In a double mode according to the method of the present invention, a first gear-shaped tool is placed whose axis lies in a position offset by a predetermined distance with respect to an intersection with an axis of a first gear, and which is engaged with the first gear. Besides, a second gear-shaped tool is placed whose axis lies in a position offset by a predetermined distance with respect to an intersection with an axis of a second gear, and which is engaged with the second gear.

Then, while the first gear is engaged with the first gear-shaped tool and the second gear is engaged with the second gear-shaped tool, lapping liquid is supplied to respective engaging portions, thereby applying a lapping treatment to an engaging surface of a toothed portion of the first gear and an engaging surface of a toothed portion of the second gear.

The lapping liquid employed is generally liquid including microfine abrasive particles. The microfine abrasive particles may be alumina, CBN, or others which are generally used for lapping treatment, and the material of the microfine abrasive particles are not particularly limited.

The material of the first gear 1 and the second gear 2 is not particularly limited, but generally metal such as cast iron and steel.

According to the first aspect of the present invention, since a gear-shaped tool is provided which has the same relation as hypoid gears, it is possible to apply a improved lapping treatment to an engaging surface of a toothed portion of at least one of the first gear and the second gear.

which constitute a pair of bevel gears. This is advantageous in improving precision of the engaging surface of the toothed portion. Accordingly, even when gears have been subjected to thermal treatment such as quenching, this is advantageous in reducing and obviating distortion of the thermal treatment.

BRIEF DESCRIPTION OF THE DRAWINGS

The exact nature of this invention, as well as other objects and advantages thereof, will be readily apparent from consideration of the following specification relating to the annexed drawings in which.

DETAILED DESCRIPTION OF THE PREFERRED EMBODIMENT

Now, a preferred embodiment according to the present invention will be described with reference to FIGS. 1 to 4.

Figure 1:
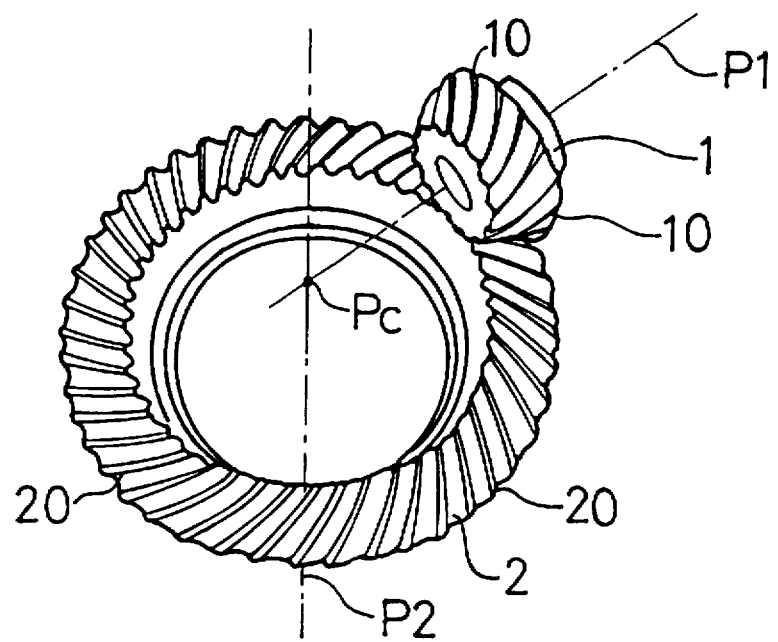
FIG. 1 is a perspective view of a pair of spiral bevel gears.

In this preferred embodiment, a first gear 1 and a second gear 2 constitute a pair of spiral bevel gears, as shown by a perspective view of FIG. 1. The first gear 1 is formed of metal such as cast iron and steel, has the shape of a pinion gear, and is provided with a first toothed portion 10 having curved tooth traces. The second gear 2 is formed of metal such as cast iron and steel, has the shape of a ring gear, and is provided with a second toothed portion 20 having curved tooth traces.

Figure 2:
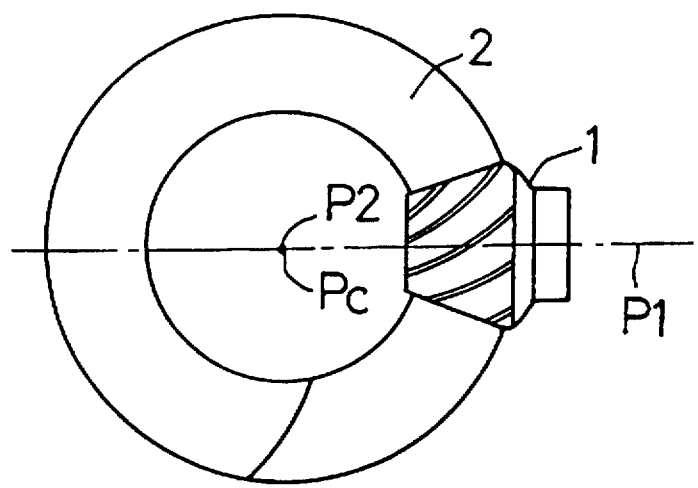
FIG. 2 is a diagrammatic plan view of the pair of spiral bevel gears.

An axis P1 of the first gear 1 and an axis P2 of the second gear 2 intersect at a point Pc at a right angle. In other words, the first gear 1 and the second gear 2 do not have the same relation as hypoid gears. A plan view of the bevel gears shown in FIG. 1 is schematically shown in FIG. 2.

Figure 3:
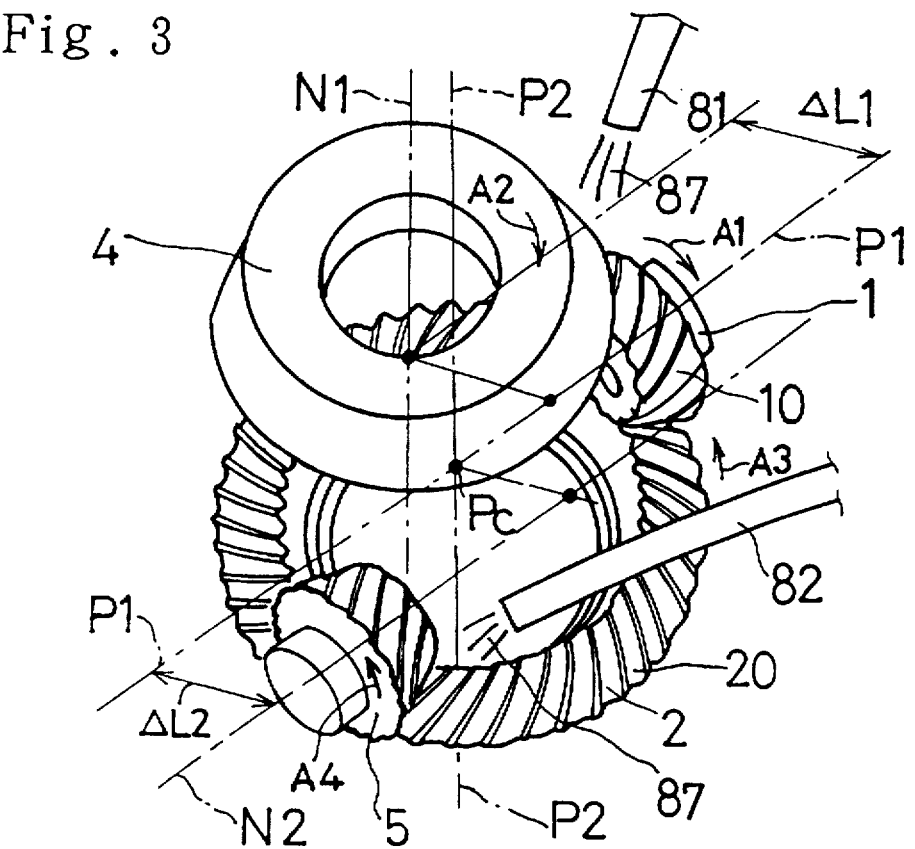
FIG. 3 is a perspective view illustrating that the pair of spiral bevel gears are lapped by using a first gear-shaped tool and a second gear-shaped tool.
Figure 4:
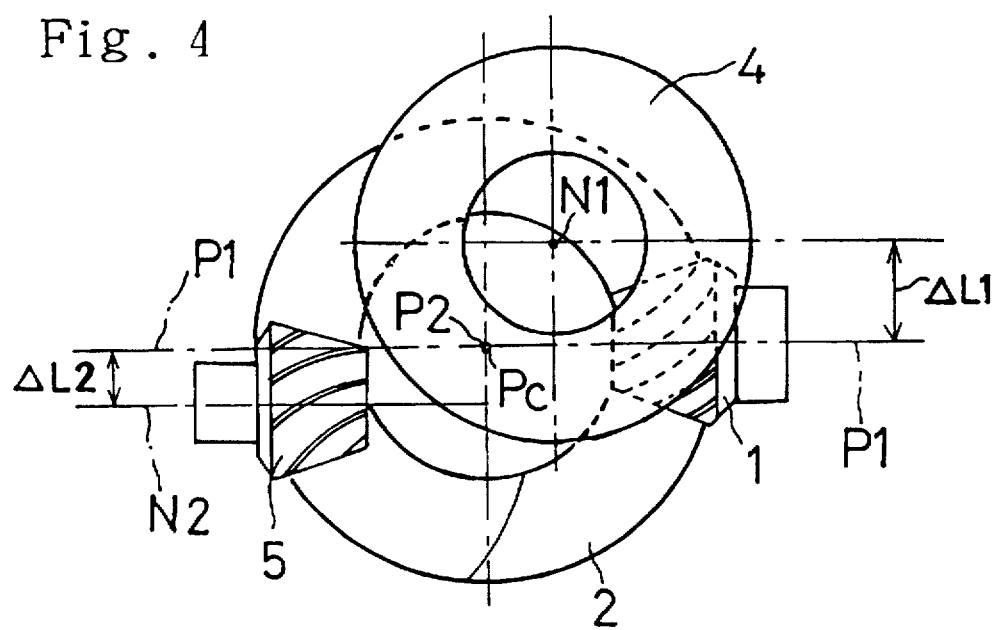
FIG. 4 is a diagrammatic plan view illustrating that the pair of spiral bevel gears are lapped by using a first gear tool and a second gear-shaped tool.

In this preferred embodiment, a first gear-shaped tool 4 in the shape of a ring gear is placed, as apparent from FIGS. 3 and 4. The first gear-shaped tool 4 is engaged with the first gear 1 in the shape of a pinion gear. In addition, a second gear-shaped tool 5 in the shape of a pinion gear is placed. The second gear-shaped tool 5 is engaged with the second gear 2 in the shape of a ring gear.

In this case, as apparent from FIGS. 3 and 4, the first gear-shaped tool 4 is placed in such a manner that an axis N1 of the first gear-shaped tool 4 is offset with respect to the axis P2 of the second gear 2.

Accordingly, the axis N1 of the first gear-shaped tool 4 is offset with respect to the axis P1 of the first gear 1 by a predetermined distance, i.e., ΔL1. Therefore, the first gear 1 and the first gear-shaped tool 4 have the same relation as hypoid gears, which have non-parallel, nonintersecting axes.

On the other hand, as apparent from FIGS. 3 and 4, the second gear-shaped tool 5 is placed in such a manner that an axis N2 of the second gear-shaped tool 5 is offset with respect to the axis P1 of the first gear 1.

Accordingly, the axis N2 of the second gear-shaped tool 5 is offset by a predetermined distance, i.e., ΔL2 with respect to the axis P2 of the second gear 2, in other words, offset with respect to the point Pc. Therefore, the second gear 2 and the second gear-shaped tool 5 have the same relation as hypoid gears, which have non-parallel, nonintersecting axes.

The first gear-shaped tool 4 and the second gear-shaped tool 5 are respectively formed of hard resin (for example, nylon resin), and have gear teeth cut so that the first gear-shaped tool 4 and the second gear-shaped tool 5 can function as master gears with high precision.

In this preferred embodiment, the first gear 1 is connected to a driving source such as a driving motor, and serves as a driving gear. Therefore, when the first gear 1 drives in the direction of the arrow A1 in FIG. 3, the first gear-shaped tool 4 which is engaged with the first gear 1 rotates in the direction of the arrow A2. Further, when the first gear 1 as a driving gear drives in the direction of the arrow A1, the second gear 2 which is engaged with the first gear 1 rotates in the direction of the arrow A3. Moreover, the second gear-shaped tool 5 which is engaged with the second gear 2 rotates in the direction of the arrow A4.

In the meanwhile, lapping liquid 87 is supplied to respective engaging portions by discharging the lapping liquid 87 respectively from a fore end of a first supply pipe 81 and a fore end of a second supply pipe 82. Thus, a lapping treatment is applied to an engaging surface of the first toothed portion 10 of the first gear 1. In a similar way, a lapping treatment is also applied to an engaging surface of the second toothed portion 20 of the second gear 2.

At this time in this preferred embodiment, although the axes of the first gear 1 and the second gear 2 do not have the same relation as those of hypoid gears, the axes of the first gear 1 and the first gear-shaped tool 4 are designed to have the same relation as those of hypoid gears as mentioned above, so that the engaging surface of the first toothed portion 10 of the first gear 1 are lapped satisfactorily. It is assumed that since the axes of the first gear 1 and the first gear-shaped tool 4 are designed to have the same relation as those of hypoid gears as mentioned above, a sliding effect is acted on the engaging surface, and the sliding causes abrasive particles to roll.

Similarly, although the axes of the first gear 1 and the second gear 2 do not have the same relation as those of hypoid gears, the axes of the second gear 2 and the second gear-shaped tool 5 are designed to have the same relation as those of hypoid gears, so that an engaging surface of the second toothed portion 20 of the second gear 2 are lapped satisfactorily.

Figure 5:
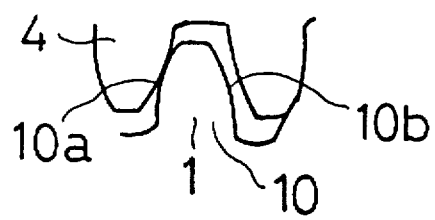
FIG. 5 is a schematic enlarged view illustrating the engagement of toothed portions.

As shown in FIG. 5, the first toothed portion 10 of the first gear 1 are provided with two sides of engaging surfaces 10a, 10b which oppose to each other. When the first gear 1 working as a driving gear is rotated in one direction, one engaging surface 10a is engaged with the first gear-shaped tool 4, so that a lapping treatment can be applied to the one engaging surface 10a. On the other hand, when the first gear 1 working as a driving gear is rotated in the opposite direction, the other engaging surface 10b is engaged with the first gear-shaped tool 4, so that the lapping treatment can be applied to the other engaging surface 10b.

This effect is also true with the second toothed portion 20 of the second gear 2, for the second toothed portion 20 of the second gear 2 is provided with two sides of engaging surfaces which oppose to each other.

Further, this preferred embodiment employs both the first gear-shaped tool 4 and the second gear-shaped tool 5 which can function as master gears. So, the engaging surface of the first toothed portion 10 of the first gear 1 is lapped by the first gear-shaped tool 4, and the engaging surface of the second toothed portion 20 of the second gear 2 is lapped by the second gear-shaped tool 5. This is advantageous in securing the pitch accuracy of the first toothed portion 10 of the first gear 1, and the pitch accuracy of the second toothed portion 20 of the second gear 2. Accordingly, this is advantageous in reducing or obviating transmission errors generating between the first gear 1 and the second gear 2.

In addition, in this preferred embodiment, when the first gear 1 as a driving gear is braked appropriately, the braking effect can be transmitted to the engagement of the first gear 1 and the first gear-shaped tool 4. This allows face pressure to increase, and as a result, an improvement in the lapping effect can be expected. In a similar way, the braking effect can be transmitted to the engagement of the second gear 2 and the second gear-shaped tool 5. This also allows face pressure to increase, and as a result, an improvement in the lapping effect can be expected.

Furthermore, in this preferred embodiment, since the first gear-shaped tool 4 and the second gear-shaped tool 5 are formed of resin, the first gear-shaped tool 4 and the second gear-shaped tool 5 more easily accept microfine abrasive particles contained in lapping liquid by way of being pricked than tools formed of metal. Therefore, microfine abrasive particles can be suppressed from pricking the engaging surface of the first toothed portion 10 of the first gear 1 which is to be used as a gear product, and the engaging surface of the second toothed portion 20 of the second gear 2 which is also to be used as a gear product. So, it is possible to suppress strange noise generation and lifetime shortening due to pricked microfine abrasive particles. This is advantageous in maintaining high quality of the first gear 1 and the second gear 2.

In the above preferred embodiment, the method of the present invention is applied to a pair of spiral bevel gears in which the first gear 1 and the second gear 2 have intersecting axes, but its application is not restricted to these.

The method of the present invention can also be applied to a first gear and a second gear which constitute a pair of hypoid gears each having a spirally toothed portion.

Figure 6:
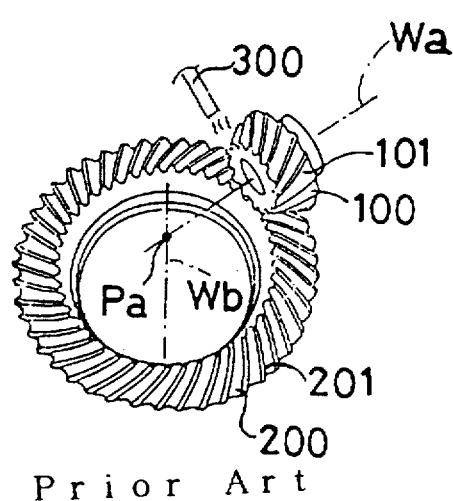
FIG. 6(A) is a perspective view of a pair of spiral bevel gears.
FIG. 6(B) is a perspective view of a pair of hypoid bears.
Figure 6:
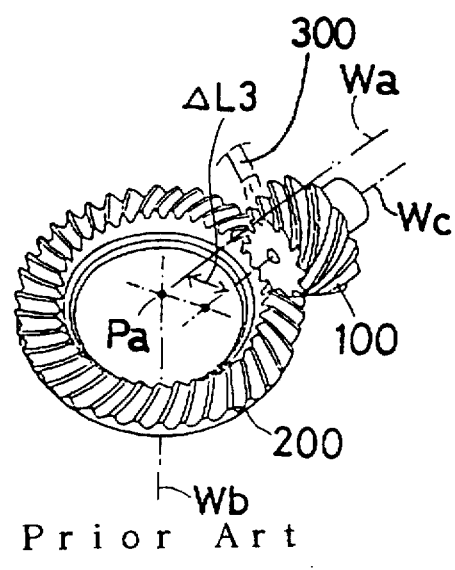
Figure 7:
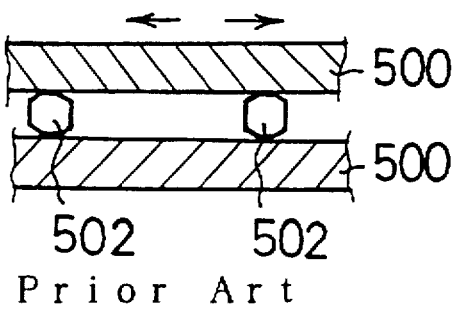
FIG. 7 is a schematic view for showing a sliding effect of a lapping agent.

Specifically, in the case of hypoid gears shown in FIG. 6(B), a first gear-shaped tool may be placed in such a manner to be offset with respect to a first gear 100, while a second gear-shaped tool may be placed in such a manner to be offset with respect to a second gear 200.

Bevel gears to which the method of the present invention is applied do not necessarily have a spirally toothed portion, and may have a straightly toothed portion.

Although the first gear-shaped tool 4 and the second gear-shaped tool 5 are formed of resin in the above preferred embodiment, the material of the tools are not limited to resin, and may be cast iron.

The method of the present invention is not limited to only the preferred embodiment described above and shown in the drawings, and can be appropriately practiced in still other ways without departing from the spirit or essential character thereof.

What is claimed is:

1. A method of lapping at least one of a first gear and a second gear constituting a pair of bevel gears, comprising the steps of:

engaging said first and second gears with one another;

placing at least one gear-shaped tool such that an axis thereof lies in a position offset by a predetermined distance with respect to an intersection with an axis of said at least one of said first gear and said second gear, and which is engaged with said at least one of said first gear and said second gear, and engaging said at least one of said first gear and said second gear with said at least one gear-shaped tool while supplying lapping liquid to engaging portions of said at least one of said first gear and said second gear and said tool, so as to apply a lapping treatment to an engaging surface of a toothed portion of said at least one of said first gear and said second gear.

2. A method of lapping a bevel gear according to claim 1, wherein the toothed portion of said first gear and the toothed portion of said second gear each have a spirally toothed portion.

3. A method of lapping a bevel gear according to claim 1, wherein said axis of said gear-shaped tool is also offset with respect to an axis of the other of said first gear and said second gear.

4. A method of lapping a bevel gear according to claim 1, wherein axes of said first gear and said second gear are designed to intersect, and said first gear and said second gear constitute a pair of spiral bevel gears.

5. A method of lapping a bevel gear according to claim 1, wherein said gear-shaped tool is formed of resin.

6. A method of lapping a bevel gear according to claim 1, wherein said gear-shaped tool functions as a master gear whose teeth are cut in a regular gear tooth shape.

7. A method of lapping a bevel gear according to claim 1, wherein one of said first gear and said second gear is connected to a driving source, and driven to rotate by said driving source, and said driving source is braked appropriately during said lapping treatment.

8. A method of lapping a bevel gear according to claim 1, wherein a said gear-shaped tool includes a first gear-shaped tool having an axis thereof which lies in a position offset by a predetermined distance with respect to an intersection with the axis of one of said first gear and said second gear, and a second gear-shaped tool having an axis thereof which lies in a position offset by a predetermined distance with respect to an intersection with an axis of the other of said first gear and said second gear, and which is engaged with the other of said first gear and said second gear, and the other of said first gear and said second gear is engaged with said second gear-shaped tool, while lapping liquid is supplied to engaging portions, so as to apply a lapping treatment to an engaging surface of a toothed portion of the other of said first gear and said second gear.

9. A method of lapping a bevel gear according to claim 8, wherein said second gear-shaped tool is formed of resin.

10. A method of lapping a bevel gear according to claim 8, wherein said second gear-shaped tool functions as a master gear whose teeth are cut in a regular gear tooth shape.

* * * * *